US012270923B2

(12) United States Patent
Huang

(10) Patent No.: US 12,270,923 B2
(45) Date of Patent: Apr. 8, 2025

(54) POSITIONING METHOD AND DEVICE, SERVER, STORAGE MEDIUM AND TERMINAL

(71) Applicant: YULONG COMPUTER TELECOMMUNICATION SCIENTIFIC (SHENZHEN) CO., LTD, Guangdong (CN)

(72) Inventor: Wentao Huang, Guangdong (CN)

(73) Assignee: YULONG COMPUTER TELECOMMUNICATION SCIENTIFIC (SHENZHEN) CO., LTD, Shenzhen (CN)

( * ) Notice: Subject to any disclaimer, the term of this patent is extended or adjusted under 35 U.S.C. 154(b) by 449 days.

(21) Appl. No.: 17/675,325

(22) Filed: Feb. 18, 2022

(65) Prior Publication Data

US 2022/0171011 A1 Jun. 2, 2022

Related U.S. Application Data

(63) Continuation of application No. PCT/CN2019/116573, filed on Nov. 8, 2019.

(30) Foreign Application Priority Data

Aug. 19, 2019 (CN) .......................... 201910764244.X

(51) Int. Cl.
*G01S 5/00* (2006.01)
*G01S 5/02* (2010.01)

(52) U.S. Cl.
CPC .......... *G01S 5/019* (2020.05); *G01S 5/02529* (2020.05)

(58) Field of Classification Search
CPC .............................. G01S 5/019; G01S 5/02529
(Continued)

(56) References Cited

U.S. PATENT DOCUMENTS

| 2012/0047245 A1* | 2/2012 | Zhou | H04L 67/34 |
| | | | 709/223 |
| 2013/0253825 A1* | 9/2013 | Xu | H04L 67/52 |
| | | | 701/522 |

(Continued)

FOREIGN PATENT DOCUMENTS

| CN | 102215561 A | 10/2011 |
| CN | 104837117 A | 8/2015 |

(Continued)

OTHER PUBLICATIONS

International Search Report with an English translation dated May 19, 2020 for Application No. PCT/CN2019/116573.

*Primary Examiner* — Hunter B Lonsberry
*Assistant Examiner* — Helen Li
(74) *Attorney, Agent, or Firm* — Ladas & Parry LLP

(57) ABSTRACT

The embodiments of the present disclosure disclose a positioning method, a device, a server, a storage medium, and a terminal, involving with the field of communication. Firstly, the positioned terminal receives the positioning request sent by the positioning server; then the positioned terminal is triggered to open the positioning module based on the positioning request, and obtains the current position information through the positioning module; the positioned terminal sends the current position information to the positioning terminal; and finally, after the completion of the sending of the current position information, the positioned terminal turns off the positioning module. Since the positioned terminal obtains the current position information through positioning module and sends the information to the positioning terminal only when it receives the positioning request sent by the positioning server and it turns off the positioning module after sending the current position information, the electric quantity consumed by the positioned terminal can be (Continued)

reduced. The save of the electric quantity of the positioning terminal leads to the improvement of the endurance time of the positioned terminal.

7 Claims, 11 Drawing Sheets

(58) Field of Classification Search
USPC .......................................................... 701/485
See application file for complete search history.

(56) References Cited

U.S. PATENT DOCUMENTS

| | | | |
|---|---|---|---|
| 2017/0171701 A1* | 6/2017 | Zhou | G01S 13/767 |
| 2017/0215168 A1* | 7/2017 | Dong | G01S 5/0244 |
| 2017/0367110 A1* | 12/2017 | Li | H04W 74/08 |
| 2018/0084519 A1* | 3/2018 | Zeng | G01S 5/0252 |
| 2018/0233042 A1* | 8/2018 | Zhang | G08G 1/096791 |
| 2018/0267134 A1 | 9/2018 | Xing | |

FOREIGN PATENT DOCUMENTS

| | | | | |
|---|---|---|---|---|
| CN | 105139459 A | | 12/2015 | |
| CN | 105550204 A | * | 5/2016 | |
| CN | 107621649 A | | 1/2018 | |
| CN | 110381439 A | | 10/2019 | |
| WO | WO-2019014981 A1 | * | 1/2019 | ........ H04W 52/0209 |

* cited by examiner

POSITIONING METHOD AND DEVICE, SERVER, STORAGE MEDIUM AND TERMINAL

RELATED APPLICATION

This application is a continuation of International Application No. PCT/CN2019/116573 filed on Nov. 8, 2019, the entire contents of which are incorporated herein by reference.

TECHNICAL FIELD

The present disclosure relates to the field of communication, and in particular, to a positioning method, a device, a server, a storage medium, and a terminal.

BACKGROUND

With the development of science and technology, everyone's life is increasingly dependent on various terminal devices, of which the positioning function is needed on many occasions. Therefore, the positioning function of the terminal becomes one of the focuses of the people skilled in the art.

In the related arts, the positioning function of the positioned terminal is either in a closed state or periodically started every preset time, sending the position information to the positioning terminal.

SUMMARY

The embodiments of the present disclosure offer a positioning method, a device, a serve, a storage medium, and a terminal to solve the technical problems in the related arts that the electricity of the positioned terminal is wasted due to the positioned terminal turns on the positioning function periodically and the positioning terminal cannot obtain the position information of the positioned terminal in time.

In the first aspect, some embodiments of the present disclosure provide a positioning method, which includes: a positioned terminal receives a positioning request sent by a positioning server, wherein the positioning request carries an identifier of a positioning terminal and the positioning request is used for requesting position information of the positioned terminal; the positioned terminal is triggered by the positioning request to turn on a positioning module and obtain current position information through the positioning module; the positioned terminal sends the current position information to the positioning terminal; and after the sending of the current position information is completed, the positioned terminal turns off the positioning module.

In the second aspect, some embodiments of the present disclosure provide a positioning device, which includes: a positioning obtaining request module configured to receive a positioning request sent by a positioning server, wherein the positioning request carries an identifier of a positioning terminal, and the positioning request is used for requesting position information of a positioned terminal; a position information obtaining module configured to, based on the positioning request, be triggered to turn on a positioning module and obtain current position information through the positioning module; a position information sending module configured to send the current position information to the positioning terminal by the positioned terminal; and a positioning closing module configured to let the positioning terminal turn off the positioning module after the sending of the current position information is completed.

In the third aspect, some embodiments of the present disclosure provide a positioning method, which includes: a positioning server receives a position acquiring request sent by a positioning terminal, wherein the position acquiring request carries an identifier of the positioning terminal; the positioning server converts the position acquiring request into a positioning request that can be recognized by a positioned terminal and includes positioning characters, and obtains the identifier of the positioned terminal matching the identifier of the positioning terminal provided by an identifier mapping table; the positioning server sends the positioning request to the positioned terminal corresponding to the identifier of the positioned terminal; the positioning server receives current position information of the positioned terminal returned by the positioned terminal, and sends the current position information to the positioning terminal corresponding to the identifier of the positioning terminal; and after the sending of the current position information is completed, the positioning server sends a position sending success instruction to the positioned terminal, wherein the position sending success instruction is used to instruct the positioned terminal to turn off a positioning module.

In the fourth aspect, some embodiments of the present disclosure provide a positioning server, which includes: a position acquiring request module configured to receive a position acquiring request sent by a positioning terminal, wherein the position acquiring request carries an identifier of the positioning terminal; an identifier matching module configured to convert the position acquiring request into a positioning request that can be recognized by the positioning terminal and that includes positioning characters, and obtains the identifier of the positioned terminal matching the identifier of the positioning terminal provided by the identifier mapping table; a positioning request sending module configured to send the positioning request to the positioned terminal corresponding to the identifier of the positioned terminal; a position information sending module configured to receive the current position information of the positioned terminal returned by the positioned terminal, and sends the current position information to the positioning terminal corresponding to the identifier of the positioning terminal; and a positioning closing instruction module configured to send a position sending success instruction to the positioned terminal after the sending of the current position information is completed, wherein the position sending success instruction is used to instruct the positioned terminal to turn off the positioning module.

In the fifth aspect, some embodiments of the present disclosure provide a computer storage medium, where stores a plurality of instructions that are adapted to be loaded and executed by a processor to implement the steps of the methods described above.

In the sixth aspect, some embodiments of the present disclosure provide a terminal, including a memory, a processor, and a processor executable computer program stored on the memory. The processor implements the steps of the methods described above when executing the program.

The beneficial effects brought by the technical solutions provided in some embodiments of the present disclosure at least include:

The present disclosure provides a positioning method, a device, a server, a storage medium, and a terminal. The positioning method comprises the following steps: firstly, a positioned terminal receives a positioning request sent by a positioning server; then the positioned terminal is triggered by the positioning request and turns on the positioning module, through which the positioned terminal obtains the current position information; the positioned terminal sends the current position information to the positioning terminal; and finally, after sending the current position information, the positioned terminal turns off the positioning module. Since the positioned terminal obtains the current position information through positioning module and sends the information to the positioning terminal only when it receives the positioning request sent by the positioning server and it turns off the positioning module after sending the current position information, the electricity consumed by the positioned terminal can be reduced. The save of the electricity of the positioning terminal leads to the improvement of the endurance time of the positioned terminal.

DETAILED DESCRIPTION OF THE EMBODIMENTS

In order to make the objectives, features, and advantages of the present disclosure more apparent and understandable, the technical solutions in the embodiments of the present disclosure will be clearly and completely described with reference to the accompanying drawings in the embodiments of the present disclosure. Obviously, the described embodiments are merely parts of the embodiments of the present disclosure, rather than all of them. Based on the embodiments of the application, all other embodiments obtained by a person skilled in the art based on the embodiments of the present disclosure without creative efforts shall fall within the protection scope of the present disclosure.

Where the following description involves the accompanying drawings, the same numbers in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure as detailed in the appended claims.

In the description of the embodiments of the present disclosure, it should be understood that in the present disclosure, unless otherwise stated, "a plurality of" refers to two or more. "and/or" describes the association relationship between the associated objects, representing that there may be three kinds of relationships between them. For example, A and/or B could refer to A alone, concurrence of A and B, or B alone. The character "i" generally indicates a "or" relationship between the associated objects.

The present disclosure will be described in detail below by way of specific embodiments.

Figure 1:
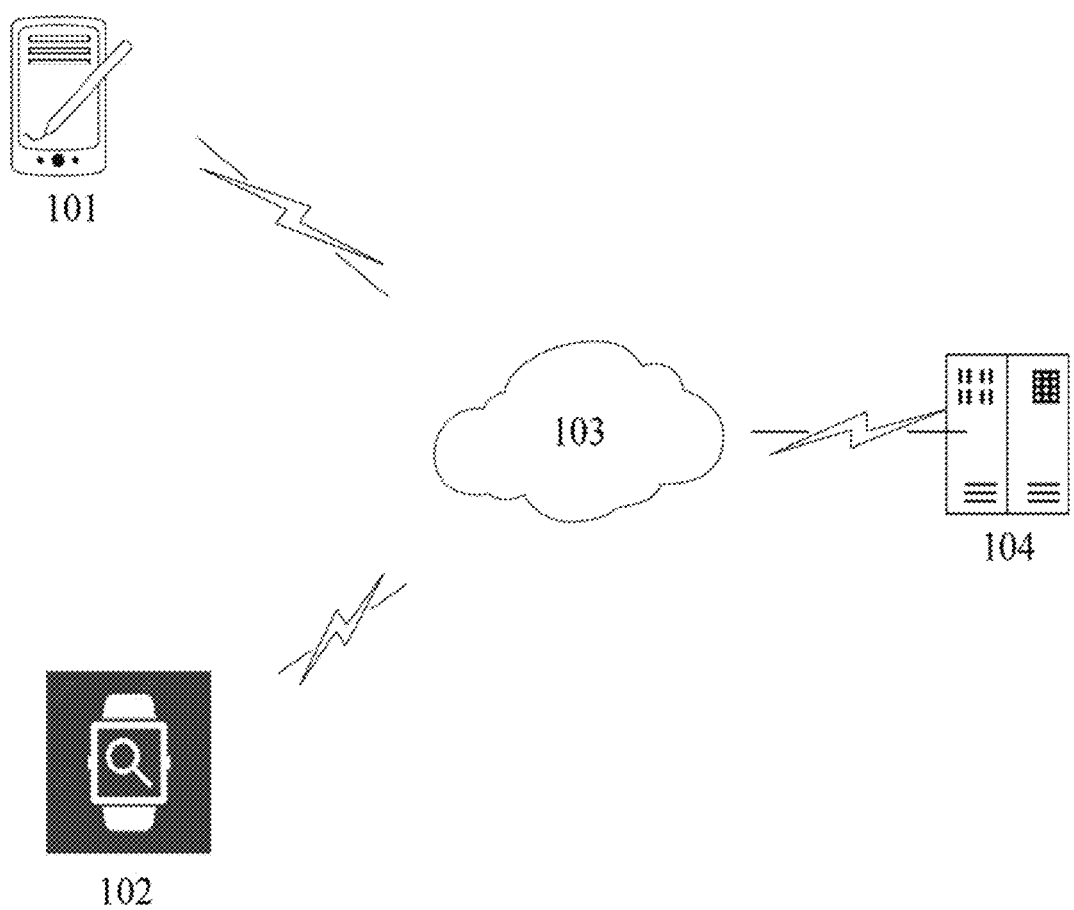
FIG. 1 is an exemplary system architecture of a positioning method according to an embodiment of the present disclosure.

FIG. 1 illustrates an exemplary system architecture of a positioning method that may be applied to an embodiment of the present disclosure.

As shown in FIG. 1, a system architecture may include a positioning terminal 101, a positioned terminal 102, a network 103, and a positioning server 104. The network 103 is configured to provide a medium for a communication link between the positioning terminal 101 and the positioned terminal 102. The network 103 may include various types of wire communication links or wireless communication links. For instance, the wire communication link includes optical fibers, twisted pairs, or coaxial cables, while the wireless communication link includes Bluetooth communication links, Wireless Fidelity (Wi-Fi) communication links, or microwave communication links.

The positioning terminal 101 and the positioned terminal 102 may interact with the positioning server 104 through the network 103 to receive a message from the positioning server 104 or send a message to the positioning server 104. The positioning terminal 101 and the positioned terminal 102 could be hardware or software. Where the positioning terminal 101 and the positioned terminal 102 are hardware, they could be different kinds of electronic devices, including but not limited to smart watches, smart phones, tablet computers, laptop computers, desktop computers, and etc. Where the positioning terminal 101 and the positioned terminal 102 are software, they could be installed in the electronic device listed above in forms of a plurality of software or software modules (for example, for providing distributed services), or in forms of single software or software module, which is not specifically limited herein.

The position server 104 may be a service server that provides various services. It should be noted that the positioning server 104 could be hardware or software. Where the positioning server 104 is hardware, it could be implemented as a distributed server cluster composed of multiple servers or be implemented as a single server. Where the positioning server 104 is software, it could be implemented as multiple software or software modules (for example, for providing distributed services), or be implemented as a single software or software module, which is not specifically limited herein.

It should be understood that the number of positioning terminals, positioned terminals, networks, and servers in FIG. 1 is merely illustrative. The number of the positioning terminal, the positioned terminal, the network and the server may be any according to the actual need.

Figure 2:
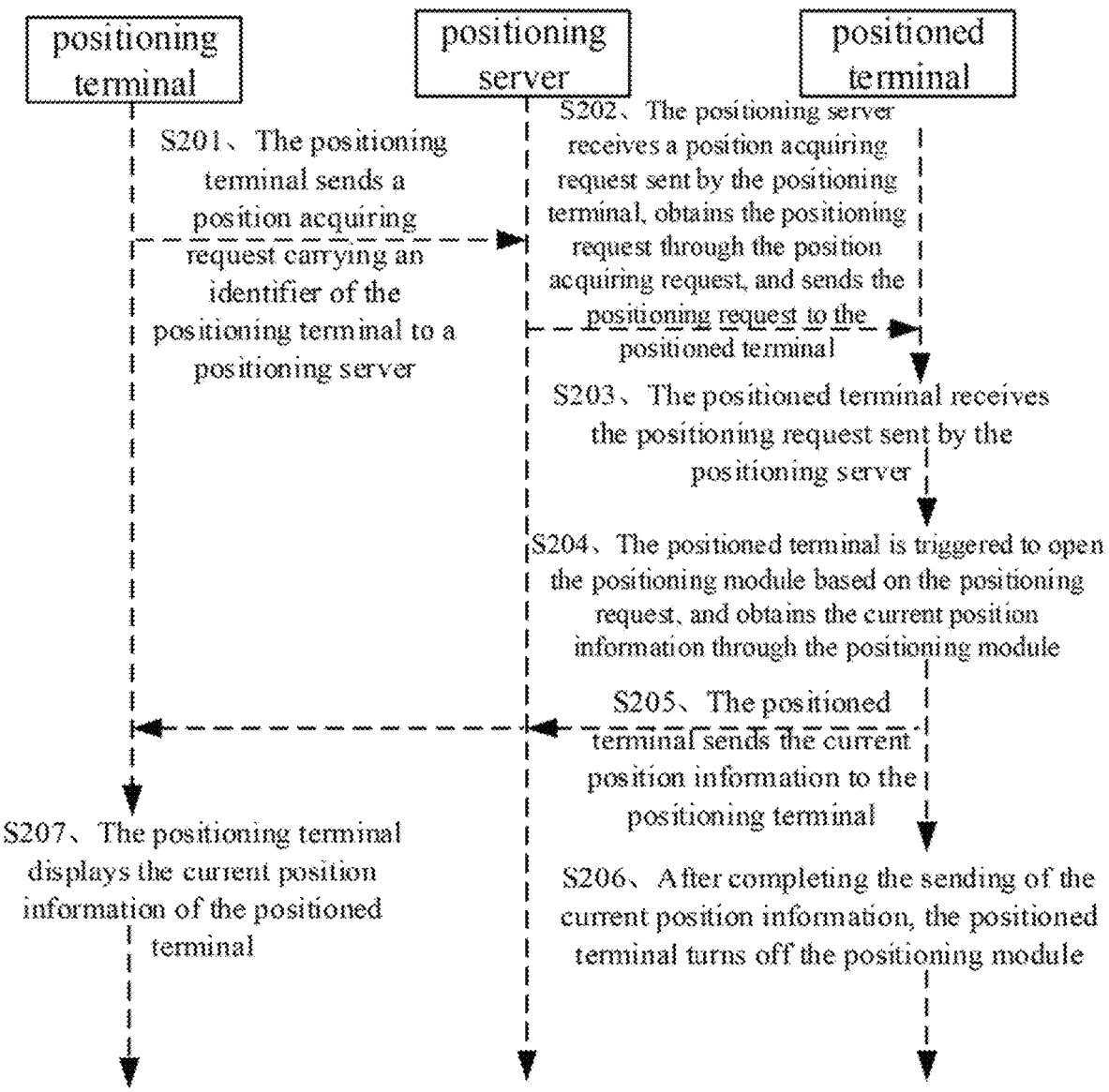
FIG. 2 is a system interaction diagram of a positioning method according to an embodiment of the present disclosure.

Please refer to FIG. 2, which is a system interaction diagram of a positioning method provided by an embodiment of the present disclosure. The process of system interaction in the positioning method will be described below with reference to FIG. 1 and FIG. 2

S201: The positioning terminal sends a position acquiring request carrying an identifier of the positioning terminal to a positioning server.

When the positioning terminal needs to acquire the current position of the positioned terminal, it will send the position acquiring request carrying the identifier of the positioning terminal to the positioning server, thereby realizing the follow-up interaction between the positioning server and the positioned terminal.

S202: The positioning server receives a position acquiring request sent by the positioning terminal, obtains the positioning request through the position acquiring request, and sends the positioning request to the positioned terminal.

Optionally, the positioning server receives the position acquiring request sent by the positioning terminal. The position acquiring request carries an identifier of the positioning terminal; the position server converts the position acquiring request into a positioning request that can be recognized by the positioning terminal and includes positioning characters, and obtains the identifier of the positioned terminal matching with the identifier of the positioning terminal provided by the identifier mapping table; and the positioning server sends the positioning request to the positioned terminal corresponding to the identifier of the positioned terminal.

Further, the positioned terminal receives the configuration request sent by the positioning server. The configuration request is used for requesting the positioned terminal to manage parameters through the NIDC mode. The positioned terminal judges whether it supports the configuration request or not based on its device information. If the positioned terminal supports the configuration request, it will call the built-in OMA client to turn on the NIDC mode and set parameter configuration for the positioned terminal. The parameter configuration comprises one or more of a transmission code rate configuration, a baud rate configuration, a data bit configuration, a parity check bit configuration, and a stop bit configuration, the positioned terminal sends a session establishment request to the positioning server based on the OMA client, and receives the session management command returned by the positioning server to establish a session with the positioning server.

S203: The positioned terminal receives the positioning request sent by the positioning server.

The positioned terminal receives the positioning request sent by the positioning server based on the OMA client, wherein the positioning request carries an identifier of the positioning terminal, and the positioning request is used for requesting the position information of the positioned terminal. The positioning request is obtained by the positioning server according to the position acquiring request sent by the positioning terminal that carries the identifier of the positioning terminal.

S204: The positioned terminal is triggered to open the positioning module based on the positioning request, and obtain the current position information through the positioning module.

Optionally, the positioned terminal obtains the instruction set corresponding to the positioned terminal. The instruction set is generated by one or more of a chip type, a chip model, a chip platform, and an operating system of the positioned terminal. The positioned terminal obtains positioning characters in the positioning request, and searches the instruction set for a position calculating instruction matched with the positioning characters. The positioned terminal sends the position calculating instruction to the modem based on the OMA client. The position calculating instruction is used for triggering the modem to open the positioning module and controlling the positioning module to calculate the current position to get the current position information; and the positioned terminal obtains the current position information based on the modem.

S205: The positioned terminal sends the current position information to the positioning terminal.

Optionally, the positioned terminal sends the current position information to the positioning terminal corresponding to the identifier of the positioning terminal in the form of a short message based on the modem; and/or the positioned terminal sends the current position information to the positioning server based on the modem and sends the current position information to the positioning terminal corresponding to the identifier of the positioning terminal through the positioning server.

S206: After completing the sending of the current position information, the positioned terminal turns of the positioning module.

The calculation of the current position information by positioning module consumes a lot of electricity energy. After the positioned terminal sends the current position information to the positioning terminal directly or through the server, there is no need for the positioning module to continue calculating the current position information. Therefore, the positioned terminal may turn off the positioning module after completing the sending of the current position information to stop the positioning module calculating the current position information. So that the electric quantity consumed by the positioning terminal can be reduced, and the save of the electric quantity of the positioning terminal leads to the improvement of the endurance time of the positioned terminal.

S207: The positioning terminal displays the current position information of the positioned terminal.

In an embodiment of the present disclosure, firstly, the positioned terminal receives the positioning request sent by the positioning server; then the positioned terminal is triggered to open the positioning module based on the positioning request, and obtains the current position information through the positioning module; the positioned terminal sends the current position information to the positioning terminal; and finally, after the completion of the sending of the current position information, the positioned terminal turns off the positioning module. Since the positioned terminal obtains the current position information through positioning module and sends the information to the positioning terminal only when it receives the positioning request sent by the positioning server and it turns off the positioning module after sending the current position information, the electricity consumed by the positioned terminal can be reduced. The save of the electricity of the positioning terminal leads to the improvement of the endurance time of the positioned terminal.

The positioning method provided in the embodiments of the present disclosure will be described in detail below with reference to FIG. 3 to FIG. 5.

Figure 3:
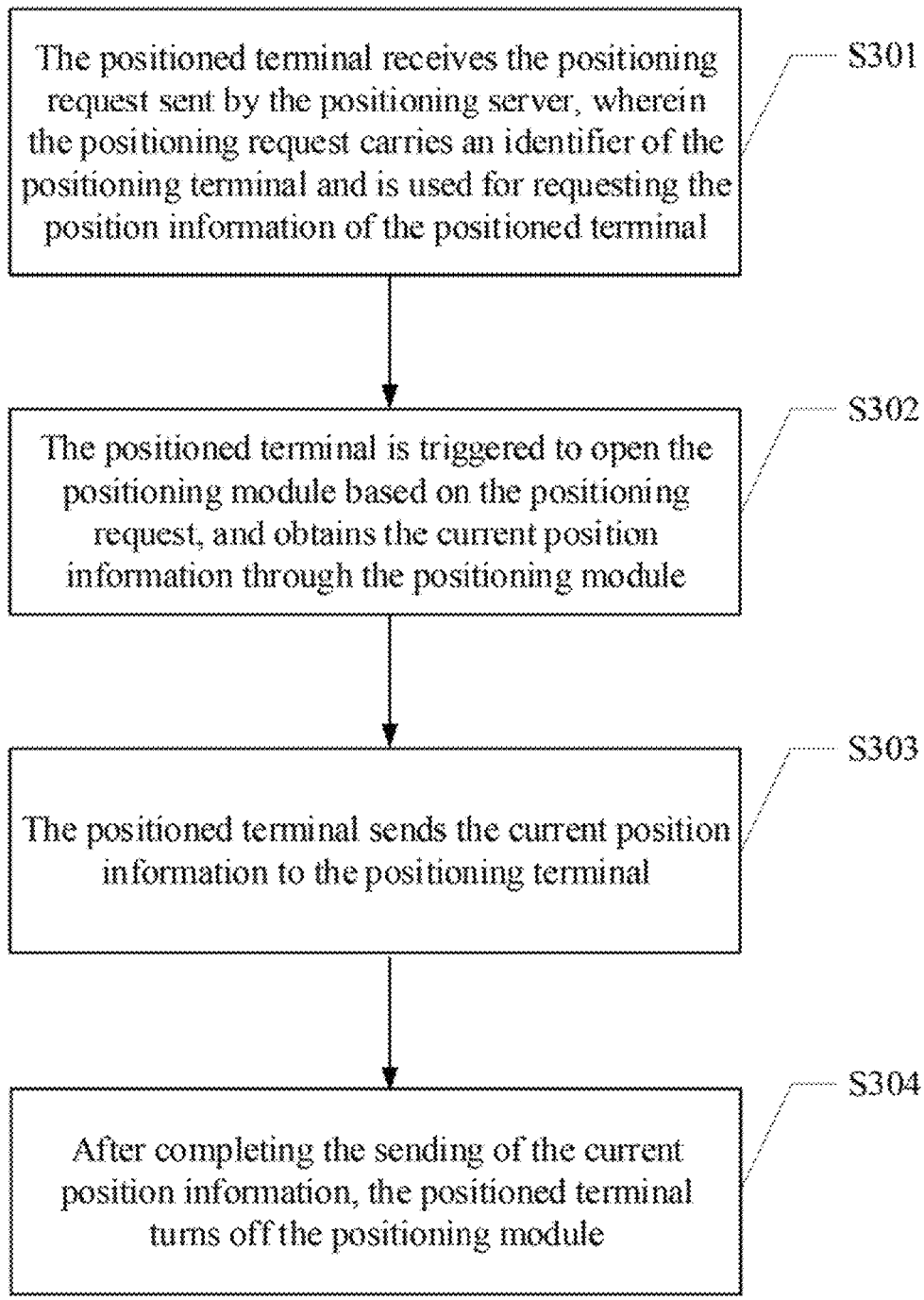
FIG. 3 is a flowchart of a positioning method according to an embodiment of the present disclosure.

Please refer to FIG. 3, which is a flowchart of a positioning method provided by an embodiment of the present disclosure.

S301: The positioned terminal receives the positioning request sent by the positioning server, wherein the positioning request carries an identifier of the positioning terminal and is used for requesting the position information of the positioned terminal.

The positioning terminal and the positioned terminal could be different kinds of electronic devices, including but not limited to smart watches, smart phones, tablet computers, laptop computers, desktop computers, and etc. For example, when the positioning terminal is a smart phone and the positioned terminal is a smart watch, the positioning terminal and the positioned terminal can be used in a situation like this: parents use the smart phone and the child uses the smart watch. When the parents need to know the position information of the child, they may use smart phones to send a request to the positioning server for the position information of the smart watch. That is, the positioned terminal sends a position acquiring request to the positioning server to acquire the position information of the positioned terminal. In order to identify the positioned terminal corresponding to the positioning terminal, the positioning request carries the identifier of the positioning terminal which represents the identity information of the positioning terminal. The identifier of the positioning terminal may include one or more of a device code (an international mobile device identification code and/or integrated circuit card identification code information), a communication number, and user's identity information of the positioning terminal. The identifier of the positioning terminal may be represented by a character string, a character array or a function identifier. The embodiment of the present disclosure does not limit the specific information and the representation forms of the identifier of the positioning terminal.

Optionally, there is a correspondence between the positioning terminal and the positioned terminal. The positioning terminal sends a position acquiring request to the positioning server, indicating that the positioning terminal needs to acquire the position information of the positioned terminal. The positioning server gets the positioning request based on the position acquiring request and determines the identifier of the positioned terminal to be acquired by the positioning terminal according to the identifier of the positioning terminal carried in the position acquiring request. The positioning server sends the positioning request to the positioned terminal corresponding to the identifier of the positioned terminal, and the positioned terminal receives the positioning request sent by the positioning server. Therefore, the positioning request is used to request the positioned terminal to acquire its current position information, so as to send the current position information of the positioned terminal to the positioning terminal later.

Optionally, the positioning server and the positioned terminal can transmit data based on the OMA (Open Mobile Alliance) DM (Device Management) Protocol, wherein the OMA regulates the interface between the service application layer and the network function layer and defines a public standard framework to provide users with a seamless end-to-end service. The OMA DM protocol refers to the specification of the Open Mobile Alliance to the definition of terminal management to ensure the interoperability of the device application. Therefore, the positioning server and the positioned terminal can both be configured based on the OMA DM protocol to make the positioning server send a positioning request based on the OMA DM protocol. When the positioned terminal receives the positioning request, it can decode the meaning of the positioning request more quickly based on the OMA client so as to execute relevant operations in time.

S302: The positioned terminal is triggered to open the positioning module based on the positioning request, and obtains the current position information through the positioning module.

It may be understood that since the positioning server and the positioned terminal may transmit data based on the OMA DM protocol, the positioned terminal has a built-in OMA client and may be configured based on the OMA DM protocol. The OMA client may be a program, and the positioning terminal may perform data transmission and other interaction operations based on the OMA DM protocol between the OMA client and the positioned terminal.

Optionally, because the positioned terminal can decode the position calculating instruction corresponding to the positioning request and send the position calculating instruction to the modem according to the OMA DM protocol after it receives the positioning request sent by the positioning server, the modem can control the positioning module to calculate the current position information of the positioned terminal through the position calculating instruction.

S303: The positioned terminal sends the current position information to the positioning terminal.

Optionally, after the positioning module calculates the current position information of the positioned terminal, the positioned terminal may obtain the current position information calculated by the positioning module based on the OMA client, and send the current position information to the positioning server by the OMA client based on the OMA DM protocol, and then send the current position information to the positioning terminal through the positioning server, so as to realize the process of obtaining the current position information of the positioned terminal by the positioning terminal.

Optionally, since the positioning request carries the identifier of the positioning terminal, after the positioning module calculates the current position information of the positioned terminal, the positioned terminal may obtain the current position information calculated by the positioning module based on the OMA client, and send the current position information of the positioned terminal to the positioning terminal in a short massage through the OMA client based on the identifier of the positioning terminal, such as the communication number of the positioning terminal included in the identifier of the positioning terminal, so as to realize the process of obtaining the current position information of the positioned terminal by the positioning terminal.

S304: After completing the sending of the current position information, the positioned terminal turns off the positioning module.

Optionally, the calculation of the current position information by positioning module consumes a lot of electricity energy. After the positioned terminal sends the current position information to the positioning terminal directly or through the server, there is no need for the positioning module to continue calculating the current position information. Therefore, the positioned terminal may turn off the positioning module after completing the sending of the current position information to stop the positioning module calculating the current position information. So that the electricity consumed by the positioning terminal can be reduced, and the save of the electricity of the positioning terminal leads to the improvement of the endurance time of the positioned terminal.

In an embodiment of the present disclosure, firstly, the positioned terminal receives the positioning request sent by the positioning server; then the positioned terminal is triggered to open the positioning module based on the positioning request, and obtains the current position information through the positioning module; the positioned terminal sends the current position information to the positioning terminal; and finally, after the completion of the sending of the current position information, the positioned terminal turns off the positioning module. Since the positioned terminal obtains the current position information through positioning module and sends the information to the positioning terminal only when it receives the positioning request sent by the positioning server and it turns off the positioning module after sending the current position information, the electric quantity consumed by the positioned terminal can be reduced. The save of the electric quantity of the positioning terminal leads to the improvement of the endurance time of the positioned terminal.

Figure 4:
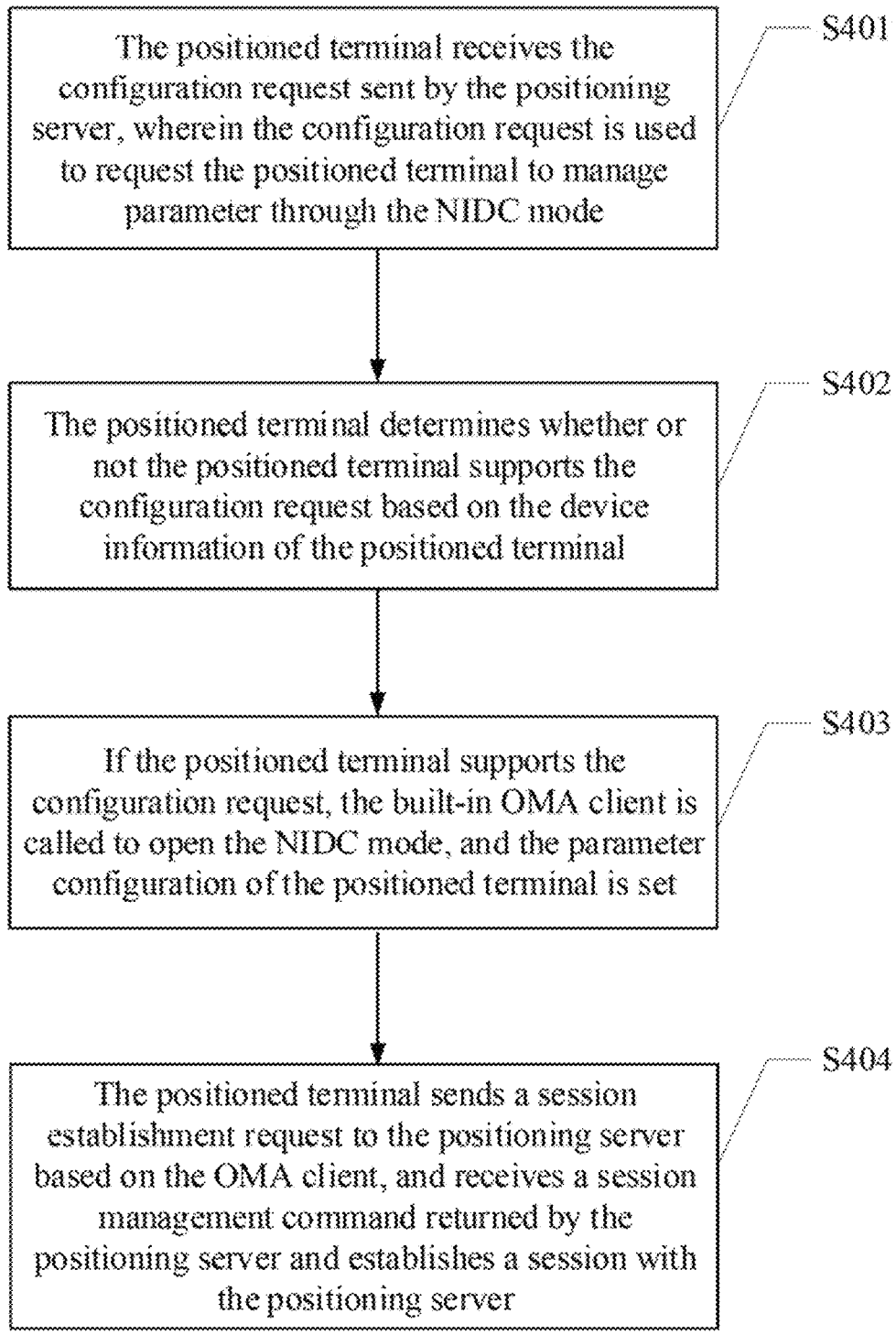
FIG. 4 is a flowchart of a positioning method according to another embodiment of the present disclosure.

Please refer to FIG. 4, which is a flowchart of a positioning method provided by another embodiment of the present disclosure.

As shown in FIG. 4, in an embodiment of the present disclosure, the positioning server and the positioned terminal can transmit data based on the OMA DM protocol, wherein the OMA regulates the interface between the service application layer and the network function layer and defines a public standard framework to provide users with a seamless end-to-end service. The OMA DM protocol refers to the specification of the Open Mobile Alliance to the definition of terminal management to ensure the interoperability of the device application. Therefore, the positioning server and the positioned terminal can both be configured based on the OMA DM protocol to make the positioning server send a positioning request based on the OMA DM protocol. When the positioned terminal receives the positioning request, it can decode the meaning of the positioning request more quickly based on the OMA client so as to execute relevant operations in time.

Therefore, in the above embodiment, before the positioning terminal receives the positioning request sent by the positioning server, the method may further include the following steps:

S401: The positioned terminal receives the configuration request sent by the positioning server, and the configuration request is used to request the positioned terminal to manage parameter through the NIDC mode.

Optionally, after the positioning server receives the position-acquiring request sent by the positioning terminal, the position-acquiring request is parsed to obtain the positioning request, and the identifier of the positioned terminal is obtained by the identifier of the positioning terminal carried in the position acquiring request. At this time, the positioning server needs to establish a session between the positioned terminal based on the OMA DM protocol before sending the positioning request to the positioned terminal corresponding to the identifier of the positioned terminal, so that the positioning server can transmit data and make interaction operation based on the OMA DM protocol later.

It can be understood that in the OMA DM protocol, there are mainly two modes for parameter management, including the CIDC mode and the NIDC mode, wherein the CIDC mode refers to the parameter configuration and management initiated by the device side to the server side, while the NIDC mode refers to the parameter configuration and management initiated by the server side to the device side. For ease of description herein, the process of establishing a session between the positioning server and the positioned terminal is introduced taking the NIDC mode as an example.

Optionally, the positioned terminal receives the configuration request sent by the positioning server, wherein the positioned terminal may obtain the configuration request by means of a hypertext protocol or a short message. The configuration request is used to request the positioned terminal to manage the parameter through NIDC mode, so as to perform subsequent data transmission through the OMA DM protocol.

S402: The positioned terminal determines whether or not the positioned terminal supports the configuration request based on the device information of the positioned terminal.

Since the positioned terminal may include various software and various hardware devices, and not all software and hardware could support the OMA DM protocol. After receiving the configuration request sent by the positioning server, the positioned terminal needs to determine whether the positioned terminal supports the NIDC mode. Firstly, the positioned terminal obtains the device information of the positioned terminal. The device information may include one or more of a chip type, a chip model, a chip platform, and an operating system of the positioned terminal; then the positioned terminal performs matching analysis according to the specific data included in the device information and parameters included in the configuration request to determine whether the positioned terminal supports the configuration request, that is, whether the positioned terminal supports the NIDC mode.

S403: if the positioned terminal supports the configuration request, the built-in OMA client is called to open the NIDC mode, and the parameter configuration of the positioned terminal is set. The parameter configuration comprises one or more of a transmission code rate configuration, a baud rate configuration, a data bit configuration, a parity check bit configuration, and a stop bit configuration.

Optionally, if the positioned terminal determines that the configuration request is supported, the positioned terminal calls the built-in OMA client to turn on the NIDC mode, wherein the OMA client may be a built-in program, and after the OMA client turns on the NIDC mode, the OMA client may receive data, requests, or instructions from the positioning server according to the OMA DM protocol. Since the data transmission between the OMA client and the positioning server may be affected by one or more parameters, the OMA client may also set parameter configuration of the positioned terminal based on the configuration request, wherein the parameter configuration may include one or more of a transmission code rate configuration, a baud rate configuration, a data bit configuration, a parity check bit configuration, and a stop bit configuration. For example, the OMA client may set the transmission rate data of the positioned terminal to be located at 1000 kilobits per second according to the parameter configuration.

S404: The positioned terminal sends a session establishment request to the positioning server based on the OMA client, and receives a session management command returned by the positioning server and establishes a session with the positioning server.

Optionally, after parameter configuration is set by the positioned terminal, data transmission and interactive operation can be performed between the positioned terminal and the positioning server based on the OMA DM protocol, that is, a session may be established between the positioned terminal and the positioning server. At this time, the positioned server may send a session establishment request to the positioning server based on the OMA client, wherein the session establishment request may carry the device information of the positioned terminal of which the parameters are configured. After receiving the session establishment request, the positioning server extracts the device information of the positioned terminal in the session establishment request, and verifies the device information. If the verification succeeds, the positioning server returns a session management command to the positioned terminal, and the positioned terminal receives the session management command returned by the positioning server and establishes a session with the positioning server. After establishing the session between the positioned terminal and the positioning server, the positioned terminal may perform data transmission and interactive operation with the positioning server based on the OMA DM protocol.

In an embodiment of the present disclosure, before sending the positioning request to the positioned terminal corresponding to the identifier of the positioned terminal, the positioning server may establish a session with the positioned terminal based on the OMA DM protocol, so that the positioning server can transmit data and perform interactive operation based on the OMA DM protocol later, and the positioned terminal can parse the meaning of the positioning request more quickly and perform relevant operations in time based on the OMA client.

Figure 5:
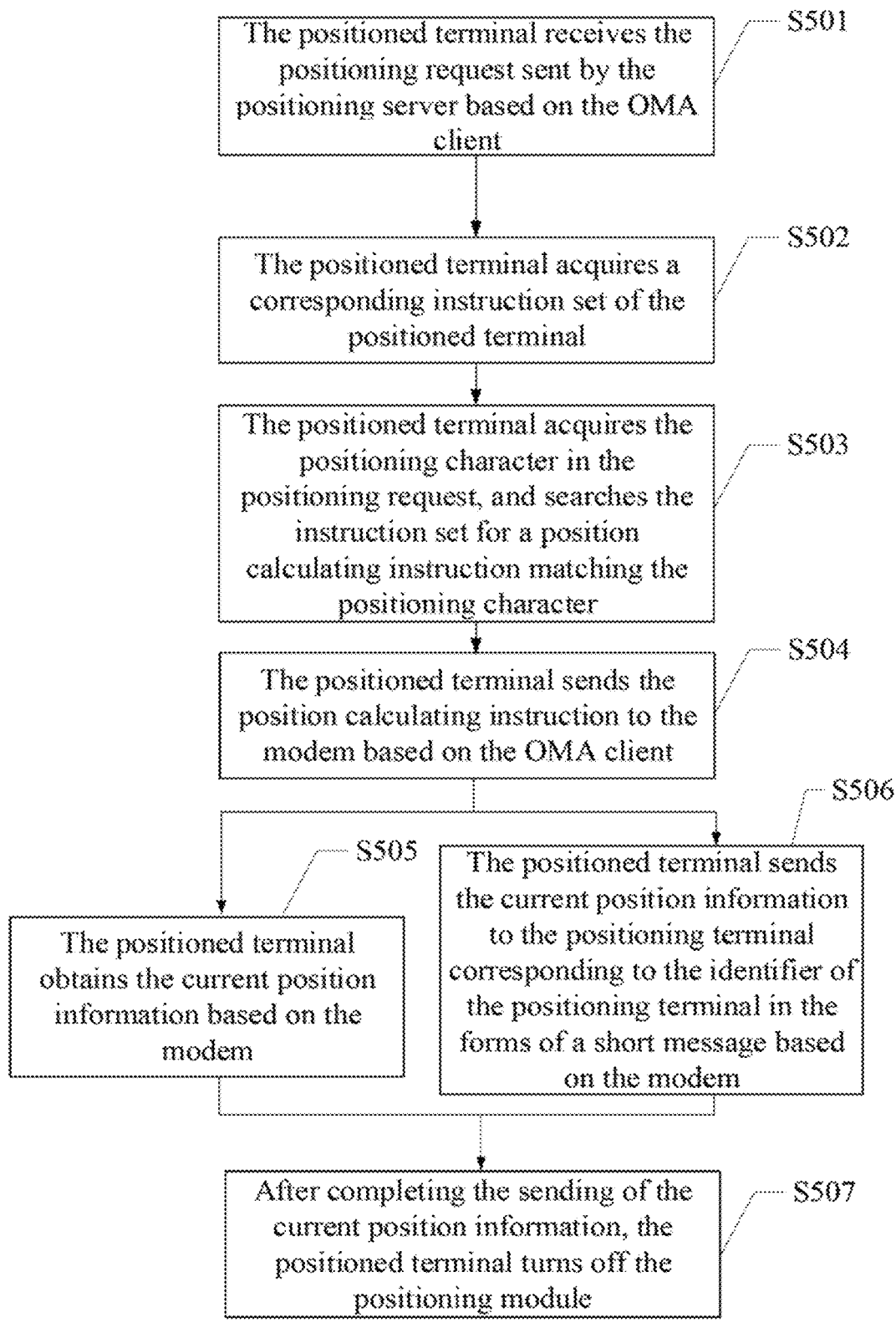
FIG. 5 is a flowchart of a positioning method according to yet another embodiment of the present disclosure.

Please refer to FIG. 5, which is a flowchart of a positioning method provided by another embodiment of the present disclosure.

As shown in FIG. 5, the method includes the following steps:

S501: The positioned terminal receives the positioning request sent by the positioning server based on the OMA client, wherein the positioning request is obtained by the positioning server according to the position acquiring request sent by the positioning terminal that carries the identifier of the positioning terminal.

When the positioning terminal needs to acquire the position information of the positioned terminal, a position acquiring request may be sent to the positioning server. In order to meet users' needs to send a position acquiring request to a positioning server through a positioning terminal in different ways, the position acquiring request sent by the positioning terminal may be not based on the OMA DM protocol for data transmission. For example, the user using the positioning terminal may log in the specified website on browser to log in the positioning server, in this way the user may send a position acquiring request to the positioning server through the positioning terminal anytime and anywhere, wherein the position acquiring request may include multiple or multiple types of data, and further includes the identifier of the positioning terminal.

Optionally, the position acquiring request may include multiple or multiple types of data, therefore after receiving the position acquiring request sent by the positioning terminal, the positioning server needs to parse and convert the position acquiring request. The positioning server converts the position acquiring request into the positioning request that can be recognized by the positioned terminal and carries the positioning character, so that the positioning server and the positioned terminal may perform data transmission based on the OMA DM protocol.

It can be understood that the positioned terminal and the positioning server may establish a session based on the OMA DM protocol, and the positioned terminal may have a built-in OMA client, so that the positioned terminal may receive a positioning request sent by the positioning server based on the OMA client, wherein the positioned terminal may obtain the positioning request sent by the positioning server by means of a hypertext protocol or a short message.

S502: The positioned terminal acquires a corresponding instruction set of the positioned terminal, wherein the instruction set is generated by one or more of the chip type, the chip model, the chip platform, and the operating system of the positioned terminal.

After receiving the positioning request, the OMA client of the positioned terminal needs to parse the instruction corresponding to the positioning request according to the instruction set. Since the device model adopted by the positioned terminal and its operating system are different, the instruction set corresponding to the positioned terminal is also different, Therefore, the corresponding instruction set of the positioned terminal needs to be acquired first, wherein the instruction set is generated by one or more of the chip type, the chip model, the chip platform, and the operating system of the positioned terminal.

S503: The positioned terminal acquires the positioning character in the positioning request, and searches the instruction set for a position calculating instruction matching the positioning character.

In the above steps and method, the positioning server and the positioned terminal transmit the positioning request based on the OMA DM protocol, so that the positioning request may include characters or character strings representing the positioning. For example, the positioning request may be: /oma/location, wherein the character/oma represents that the positioning request is transmitted based on the OMA DM protocol, and the character/location represents that the positioning request instructs the positioned terminal to perform the positioning operation, that is, the character/location is the positioning character. The instruction set includes a plurality of instructions, each instruction may be a program or a string of codes, and therefore each instruction also includes an instruction character or an instruction character string, for example, the instruction set includes a position calculating instruction. For example, the position calculating instruction is a gps_location service, and the position calculating instruction may include an instruction character: mcm_gps_location_t_v01, so that the positioned terminal can search the instruction set for the instruction character matching the positioning character, and obtain the instruction corresponding to the instruction character, i.e., the position calculating instruction corresponding to the positioning request.

S504: The positioned terminal sends the position calculating instruction to the modem based on the OMA client, wherein the position calculating instruction is used to trigger the modem to open the positioning module and control the positioning module to calculate the current position information.

After obtaining the position calculating instruction, the positioned terminal sends the position calculating instruction and the identifier of the positioning terminal to the modem based on the OMA client. After receiving the position calculating instruction, the modem turns on the positioning module and control it to calculate the current position, wherein the positioning module may include GPS module or Beidou module. The positioning module obtains the current position information through the algorithm built in the GPS or Beidou module.

S505: The positioned terminal obtains the current position information based on the modem.

After obtaining the current position information through calculating, the positioning module sends the current position information to the modem, that is, the positioned terminal may obtain the current position information based on the modem.

It can be understood that after obtaining the current position information, the modem could send the information to the positioning terminal directly, and/or uploads the current position information to the positioning server, which in turn sends the current position information to the positioning terminal. That is, the positioned terminal sends the current position information to the positioning terminal, including:

S506: The positioned terminal sends the current position information to the positioning terminal corresponding to the identifier of the positioning terminal in the forms of a short message based on the modem.

Since the positioning request carries the identifier of the positioning terminal, which may include the communication number of the positioning terminal, the modem could send the current position information to the communication number of the positioning terminal in the form of a short message, that is, the modem sends the current position information to the positioning terminal corresponding to the identifier of the positioning terminal. With the above method, the positioning terminal can receive the current position information sent by the positioned terminal even when there is no network, which improves the practicability of the positioning method. And/Or S507: The positioned terminal sends the current position information to the positioning server based on the modem and sends the current position information to the positioning terminal corresponding to the identifier of the positioning terminal through the positioning server.

After the modem obtains the current position information, the OMA client can request to obtain the current position information from the modem in the form of synchronous or asynchronous messages. After receiving the current position information, the OMA client sends the current position information carrying the identifier of the positioning terminal to the positioning server based on OMA DM protocol. After receiving the current position information from the OMA client, the positioning server sends the current position information to the positioning terminal corresponding to the identifier of the positioning terminal. Since the above way is implemented by the positioning terminal on the basis of networking, the positioning terminal can display more information on its display interface based on the current position information sent by the server and the network. For example, displaying the real-time network map and the current position of the positioned terminal on the network map on the display interface of the positioning terminal based on the network map to improve the accuracy of the positioning method.

S508: After completing the sending of the current position information, the positioned terminal turns off the positioning module.

Optionally, the calculation of the current position information by positioning module consumes a lot of electricity energy. After the positioned terminal sends the current position information to the positioning terminal directly or through the server, there is no need for the positioning module to continue calculating the current position information. Therefore, the positioned terminal may turn off the positioning module after completing the sending of the current position information to stop the positioning module calculating the current position information. So that the electricity consumed by the positioning terminal can be reduced, and the save of the electricity of the positioning terminal leads to the improvement of the endurance time of the positioned terminal.

In an embodiment of the present disclosure, by acquiring the positioning request converted from the position acquiring request, obtaining the position calculating instruction corresponding to the positioning request, and triggering the modem to turn on the positioning module through the position calculating instruction and obtaining the current position information through controlling the positioning module to calculate the position information, it is realized that the operation to be performed of the positioning request is obtained by quickly analyzing the positioning request, and the speed of obtaining the current position information by the positioned terminal is improved.

Figure 6:
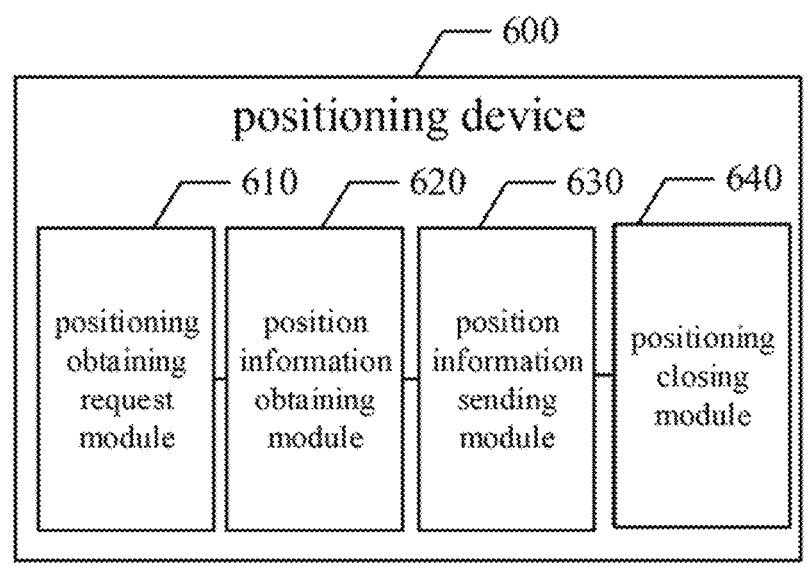
FIG. 6 is a structure diagram of a positioning device according to an embodiment of the present disclosure.

Please refer to FIG. 6, which is a structure diagram of a positioning method provided by an embodiment of the present disclosure.

As shown in FIG. 6, this positioning device 600 includes: a positioning request obtaining module 610 configured to receive positioning requests sent by the positioning server, wherein the positioning request carries an identifier of the positioning terminal, and the positioning request is used for requesting the position information of the positioned terminal; a position information obtaining module 620 configured to turn on the positioning module when it is triggered based on the positioning request, and to obtain the current position information through the positioning module; a position information sending module 630 configured to send the current position information to the positioning terminal by positioned terminal; a positioning closing module 640 configured to let the positioned terminal turn off the positioning module after the sending of the positioning information is completed.

Figure 7:
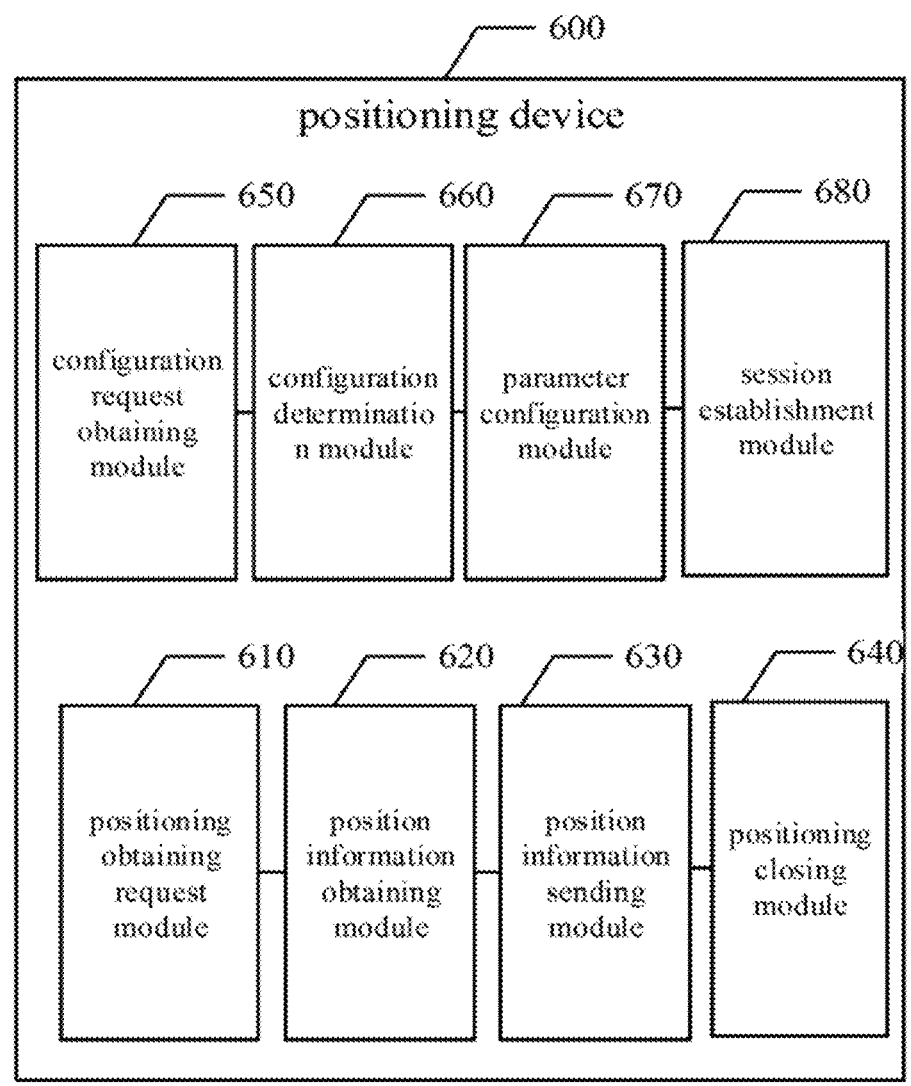
FIG. 7 is a structure diagram of a positioning device according to another embodiment of the present disclosure.

Please refer to FIG. 7, which is a structure diagram of a positioning device provided by another embodiment of the present disclosure.

As shown in FIG. 7, this positioning device 60) further includes: a configuration request obtaining module 650 configured to let the positioned terminal receive the configuration request sent by the positioning server, wherein the configuration request is used to request the positioned terminal to manage parameter through the NIDC mode; a configuration determination module 660 configured to determine whether or not the positioned terminal supports the configuration request based on the device information of the positioned terminal;

a parameter configuration module 670 configured to, if the positioned terminal supports the configuration request, call the built-in OMA client to open the NIDC mode and to set the parameter configuration of the positioned terminal, wherein the parameter configuration comprises one or more of the transmission code rate configuration, the baud rate configuration, the data bit configuration, the parity check bit configuration, and the stop bit configuration;

a session establishment module 680 configured to let the positioned terminal send a session establishment request to the positioning server based on the OMA client, and receive a session management command returned by the positioning server and establish a session with the positioning server.

Figure 8:
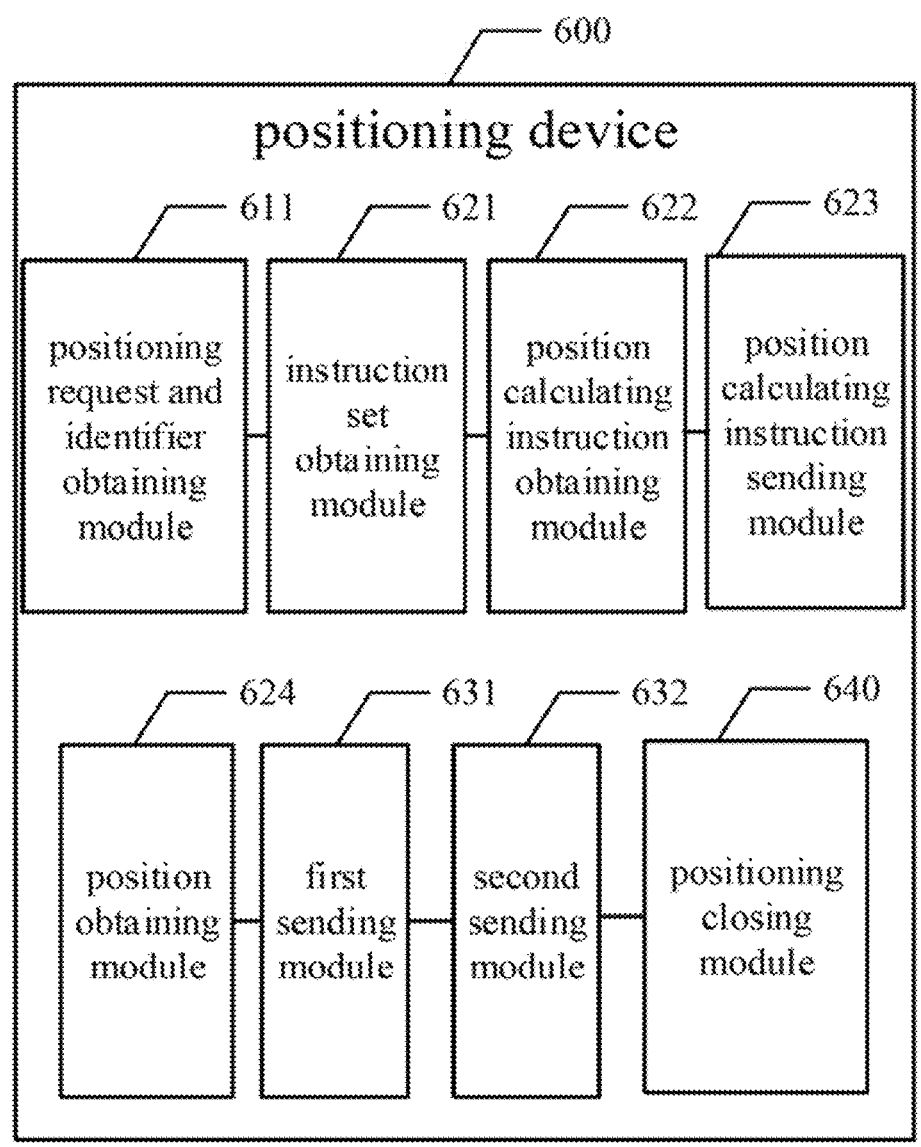
FIG. 8 is a structure diagram of a positioning device according to yet another embodiment of the present disclosure.

Please refer to FIG. 8, which is a structure diagram of a positioning device provided by another embodiment of the present disclosure.

As shown in FIG. 8, the positioning device 600 includes: a positioning request and identifier obtaining module 611 configured to let the positioned terminal receive the positioning request sent by the positioning server based on the OMA client, wherein the positioning request is obtained by the positioning server according to the position acquiring request sent by the positioning terminal that carries the identifier of the positioning terminal; an instruction set obtaining module 621 configured to let the positioned terminal acquire a corresponding instruction set of the positioned terminal, wherein the instruction set is generated by one or more of a chip type, a chip model, a chip platform, and an operating system of the positioned terminal; a position calculating instruction obtaining module 622 configured to let the positioned terminal acquire the positioning character in the positioning request, and search the instruction set for a position calculating instruction matching the positioning character; a position calculating instruction sending module 623 configured to let the positioned terminal send the position calculating instruction to the modem based on the OMA client, wherein the position calculating instruction is configured to trigger the modem to open the positioning module and control the positioning module to calculate and derive the current position information; a position obtaining module 624 configured to let the positioned terminal obtain the current position information based on the modem; a first sending module 631 configured to let the positioned terminal send the current position information to the positioning terminal corresponding to the identifier of the positioning terminal in the forms of a short message based on the modem; a second sending module 632 configured to let the positioned terminal send the current position information to the positioning server based on the modem and send the current position information to the positioning terminal corresponding to the identifier of the positioning terminal through the positioning server; a positioning closing module 640 configured to let the positioned terminal turn off the positioning module after the sending of the positioning information is completed.

In an embodiment of the present disclosure, the positioning device includes: a positioning request obtaining module, configured to receive the positioning request sent by the positioning server, wherein the positioning request carries an identifier of the positioning terminal, and the positioning request is used for requesting position information of the positioned terminal; the position information obtaining module, used for triggering to open the positioning module based on the positioning request, and acquiring current position information through the positioning module; the position information sending module, used for sending the current position information to the positioning terminal by the positioned terminal; and the positioning closing module, used for turning off the positioning module by the positioned terminal after sending the current position information. Since the positioned terminal obtains the current position information through positioning module and sends the information to the positioning terminal only when it receives the positioning request sent by the positioning server and it turns off the positioning module after sending the current position information, the electric quantity consumed by the positioned terminal can be reduced. The save of the electric quantity of the positioning terminal leads to the improvement of the endurance time of the positioned terminal.

Figure 9:
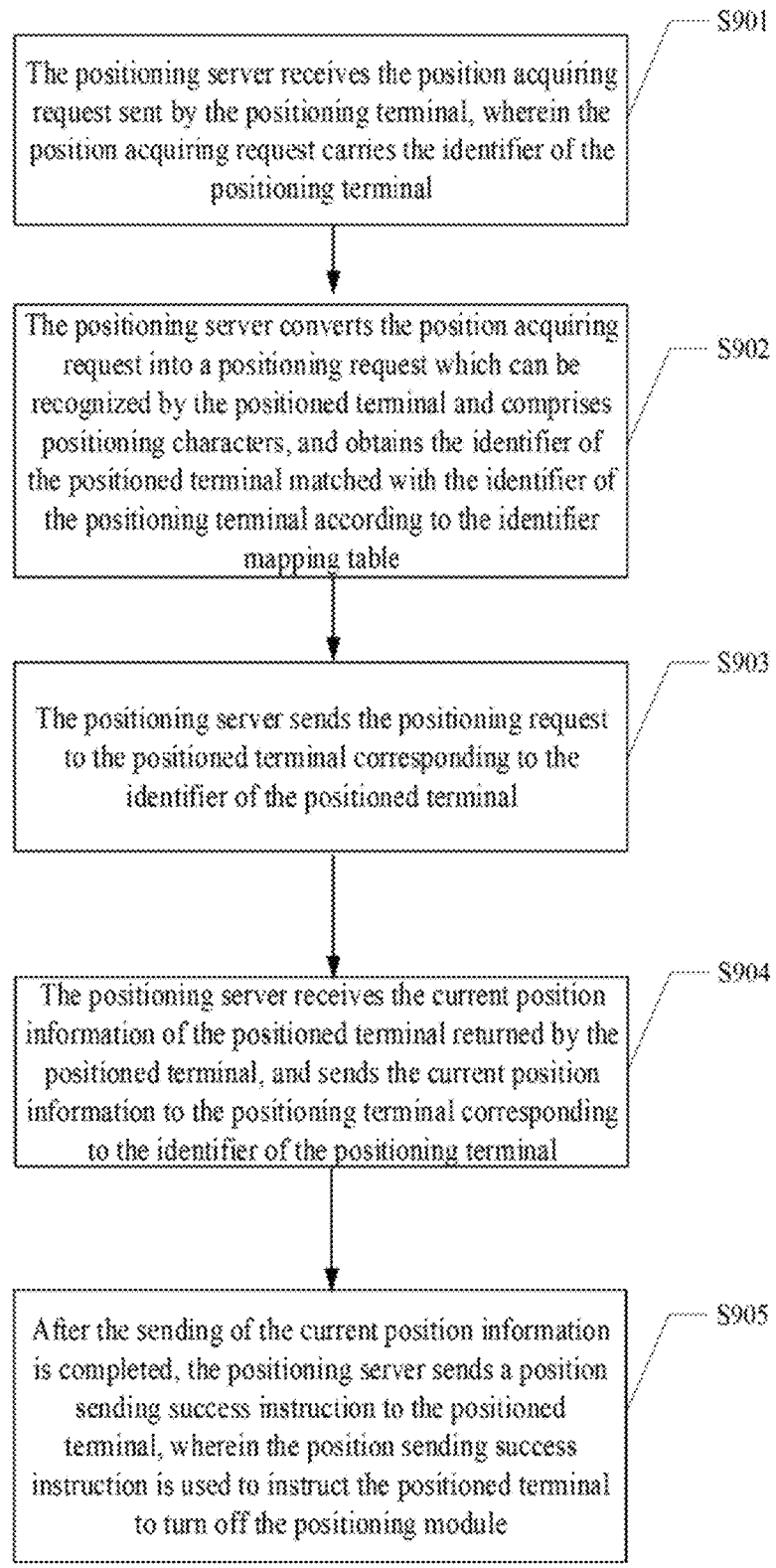
FIG. 9 is a flowchart of a positioning method according to still another embodiment of the present disclosure.

Please refer to FIG. 9, which is a flowchart of a positioning method provided by another embodiment of the present disclosure.

As shown in FIG. 9, the method includes the following steps:

S901: The positioning server receives the position acquiring request sent by the positioning terminal, wherein the position acquiring request carries the identifier of the positioning terminal.

It can be understood that before receiving the position acquiring request sent by the positioning terminal, the positioning server needs to establish the identifier mapping table first, so as to match the positioning terminal with the positioned terminal. The step of establishing the identifier mapping table by the positioning server comprises the following steps: firstly, the positioning server obtains an identifier of at least one positioning terminal, wherein the identifier of the positioning terminal can be information representing the identity of the positioning terminal, and the identifier of the positioning terminal can comprise one or more of the device code (an international mobile device identification code and/or integrated circuit card identification code information), the communication number and user identity information of the positioning terminal. The positioning server then acquires the identifier of at least one positioned terminal, and finally maps the identifier of the positioned terminal to the identifier of the positioning terminal according to a preset identification relationship, and stores the above mapping into the identifier mapping table. The preset identification relationship can be a user attribute relationship between the user of the positioned terminal and the user of the positioning terminal. For example, the user of the positioned terminal is a parent and the user of the positioning terminal is a child, in this way the communication numbers of the parent and the child could be matched to be the preset identification relationship based on their kinship, and the identifier mapping table can be obtained through the steps.

Optionally, when the positioning terminal needs to acquire the position information of the positioned terminal, an identity verification request needs to be sent to the positioning server. In order to meet users' needs to send requests to a positioning server through a positioning terminal in different ways, the requests sent by the positioning terminal may be not based on the OMA DM protocol for data transmission. For example, the user using the terminal may log in the specified website on browser to log in the positioning server, in this way the user may send requests to the positioning server through the positioning terminal anytime and anywhere. The identity verification sent by the positioning terminal to the positioning server carries an identifier of the positioning terminal. After receiving the identity verification request sent by the positioning terminal, the positioning server may find, according to the identifier of the positioning terminal carried in the identity verification request, whether there is a target identifier that is the same as the identifier of the positioning terminal in the identifier mapping table. If the identifier exists, the identity verification of the positioning terminal succeeds, and the identifier of the positioned terminal corresponding to the target identifier is obtained as the permission data corresponding to the positioning terminal. That is, the permission data may be obtained by obtaining the identifier of the positioned terminal having the mapping relation with the identifier of the positioning terminal in the identifier mapping table, in that way the permission data includes the positioned terminal corresponding to the positioning terminal and the identifier of the positioned terminal. The positioning server returns the permission data to the positioning terminal, which may display the permission data on the display interface after receiving the permission data returned from the positioning server.

Figure 10:
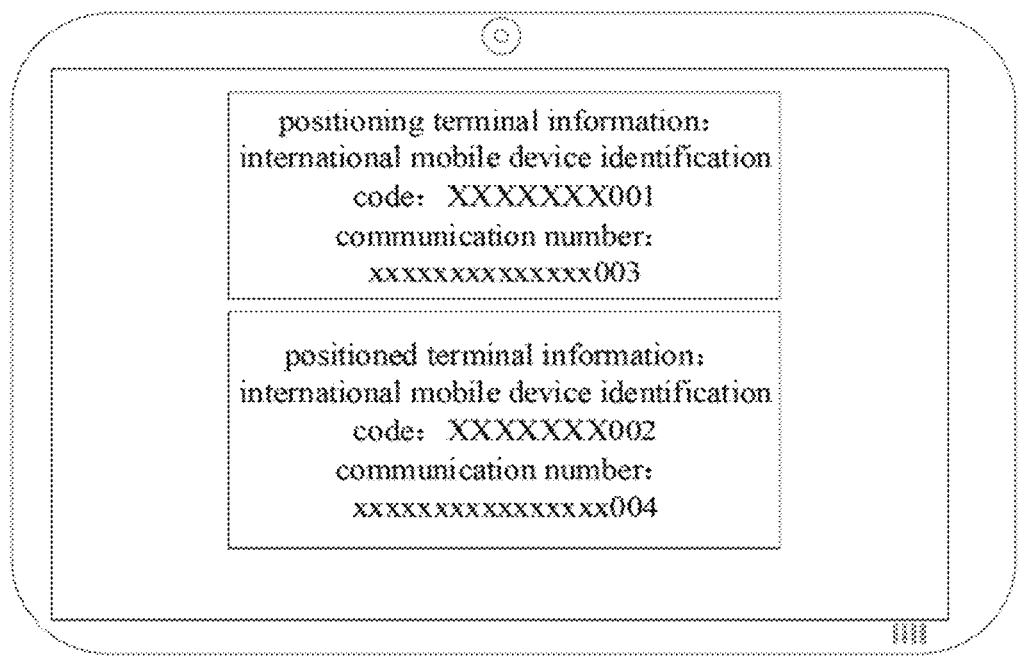
FIG. 10 is a schematic diagram of the first display interface of the positioning terminal in a positioning method according to another embodiment of the present disclosure.

Please refer to FIG. 10, which is a schematic diagram of the first display interface of the positioning terminal in a positioning method provided by another embodiment of the present disclosure; As shown in FIG. 10, the positioning terminal displays the identifier of the positioning terminal (including the international mobile device identification code and the communication number) and the identifier of the positioned terminal (including the international mobile device identification code and the communication number) on the display interface. If the user needs to acquire the position information of the positioned terminal through the positioning terminal, the user may click the identifier of the positioned terminal displayed in the display interface of the positioning terminal, and then the position acquiring request may be sent to the positioning server. In order to meet the user's need to send the position acquiring request to the positioning server through the positioning terminal in different ways, wherein the position acquiring request carries the identifier of the positioning terminal, and the positioning server receives the position acquiring request from the positioning terminal.

S902: the positioning server converts the position acquiring request into a positioning request which can be recognized by the positioned terminal and comprises positioning characters, and obtains the identifier of the positioned terminal matched with the identifier of the positioning terminal according to the identifier mapping table.

Optionally, the position acquiring request may include multiple or multiple types of data, therefore after receiving the position acquiring request sent by the positioning terminal, the positioning server needs to parse and convert the position acquiring request. The positioning server converts the position acquiring request into the positioning request that can be recognized by the positioned terminal and carries the positioning character, so that the positioning server and the positioned terminal may perform data transmission based on the OMA DM protocol, so that the rule for positioning request conversion may be specified based on the OMA DM protocol. For example, the converted positioning request may include a character or a character string representing a positioning, and the positioning request may be: /oma location, wherein the character /oma represents that the positioning request is transmitted based on the OMA DM protocol, and the character /location represents that the positioning request instructs the positioned terminal to perform the positioning operation, that is, the character/location is the positioning character.

Optionally, since the positioning request carries the identifier of the positioning terminal, the identifier of the positioned terminal matching the identifier of the positioning terminal can be obtained according to the identifier mapping table obtained in the above steps, so as to subsequently send the positioning request to the positioned terminal.

S903: The positioning server sends the positioning request to the positioned terminal corresponding to the identifier of the positioned terminal.

After the positioning server acquires the identifier of the positioned terminal, before sending the positioning request to the positioned terminal corresponding to the identifier of the positioned terminal, a session needs to be established with the positioned terminal based on the OMA DM protocol, so that the positioning server can perform data transmission and interaction operation based on the OMA DM protocol subsequently. The process of establishing the session between the positioning server and the positioned terminal may take the detailed description in the above embodiments for reference. The details will not be explained herein. After establishing the session with the positioned terminal, the positioning server can send the positioning request to the positioned terminal corresponding to the identifier of the positioned terminal through a hypertext protocol or a short message.

S904: The positioning server receives the current position information of the positioned terminal returned by the positioned terminal, and sends the current position information to the positioning terminal corresponding to the identifier of the positioning terminal.

The positioned terminal receives the positioning request sent by the positioning server based on the OMA client, obtains the corresponding instruction set of the positioned terminal, obtains the positioning characters in the positioning request and searches the instruction set for a position calculating instruction matched with the positioning characters, and sends the position calculating instruction to the modem based on the OMA client; wherein the position calculating instruction is used for triggering the modem to open the positioning module and controlling the positioning module to calculate and derive the current position information. The positioned terminal obtains the current position information based on the modem and sends the current position information to the positioning server based on the modem.

Figure 11:
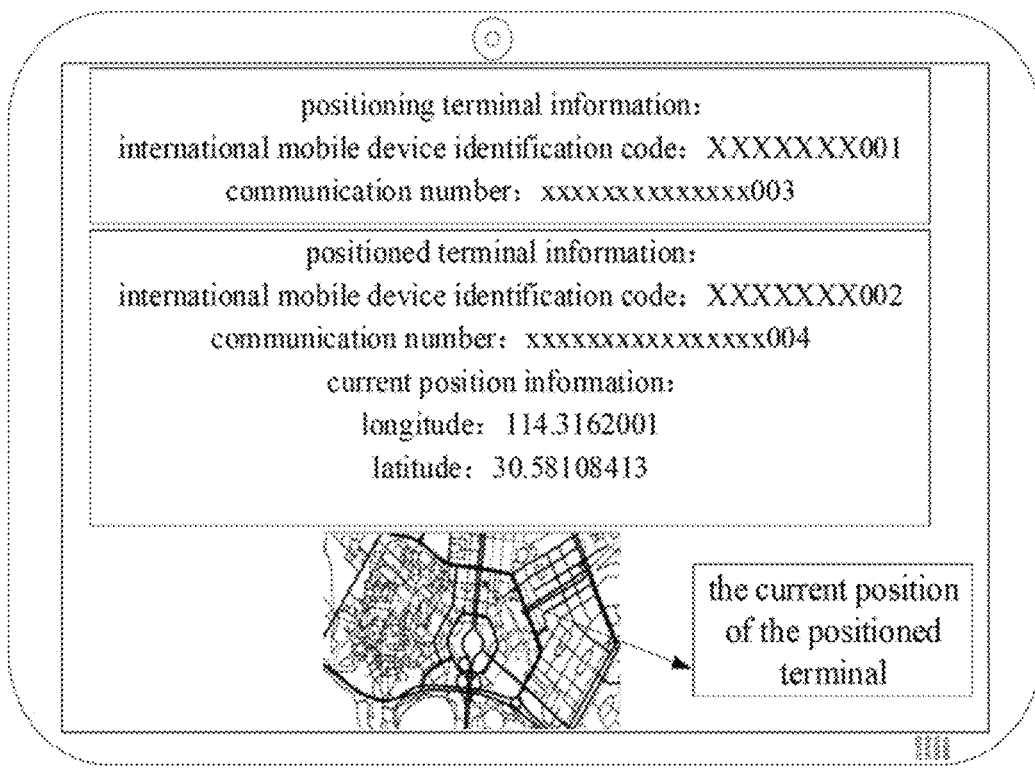
FIG. 11 is a schematic diagram of the second display interface of the positioning terminal in a positioning method according to another embodiment of the present disclosure.

The positioning server receives the current position information of the positioned terminal returned by the positioned terminal, sends the current position information to a positioning terminal corresponding to the identifier of the positioning terminal, and sends a position sending success instruction to the positioned terminal. The position sending success instruction is used for instructing the positioned terminal to turn off the positioning module. When receiving the current position information of the positioned terminal, the positioning terminal displays the current position information. Please refer to FIG. 11, which is a schematic diagram of the second display interface of the positioning terminal in a positioning method according to another embodiment of the present disclosure. As shown in FIG. 11, in addition to displaying the identifier of the positioning terminal (including the international mobile device identification code and the communication number) and the identifier of the positioned terminal (including the international mobile device identification code and the communication number) on the display interface, the positioning terminal also displays the current position information (longitude and latitude information) of the positioned terminal and the specific position of the positioned terminal in the network map.

S905: After the sending of the current position information is completed, the positioning server sends a position sending-success instruction to the positioned terminal. The position sending-success instruction is used to instruct the positioned terminal to turn off the positioning module.

When the positioning module calculates the current position information, a lot of electric energy needs to be consumed. Therefore, after the positioning server sends the current position information to the positioning terminal, the positioning module is not required to continue to calculate the current position information. After the current position information is sent, a position sending success instruction is sent to the positioned terminal to instruct it to turn off the positioning module, so that the positioning module stops calculating the current position information. The save of the electric quantity of the positioning terminal leads to the improvement of the endurance time of the positioned terminal.

Figure 12:
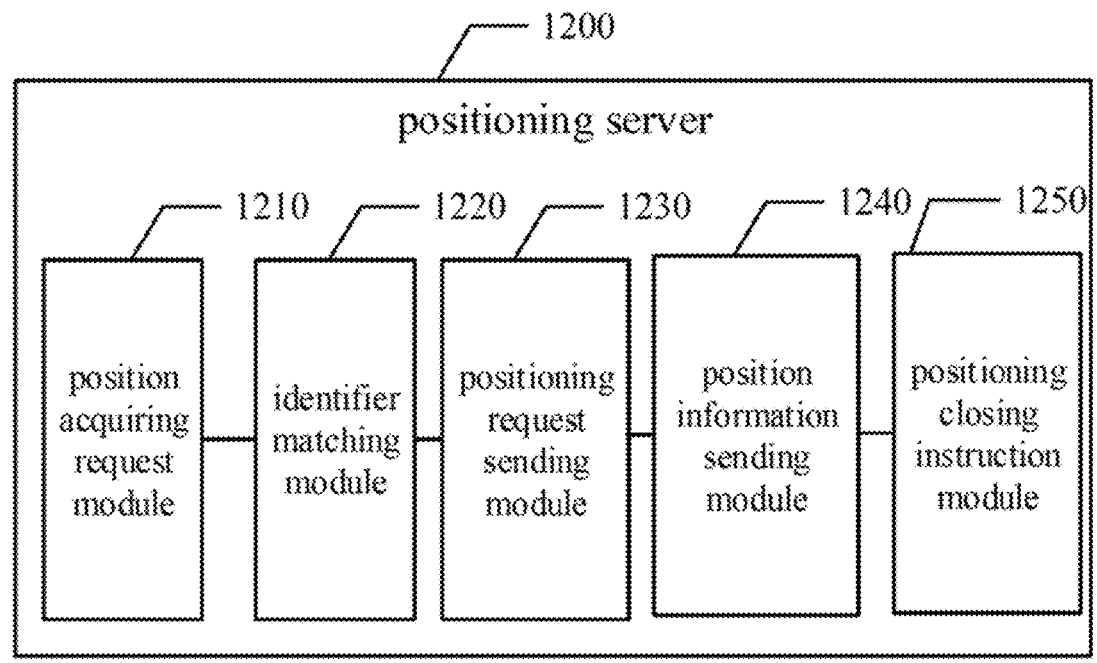
FIG. 12 is a structure diagram of a positioning server according to an embodiment of the present disclosure.

Please refer to FIG. 12, which is a structure diagram of a positioning server provided by an embodiment of the present disclosure.

As shown in FIG. 12, the positioning server 1200 comprises: a position acquiring request module 1210 configured to receive a position acquiring request sent by a positioning terminal, wherein the position acquiring request carries an identifier of the positioning terminal; an identifier matching module 1220 configured to convert the position acquiring request into a positioning request that can be recognized by a positioning terminal and comprises positioning characters, and obtain the identifier of the positioned terminal matching the identifier of the positioning terminal provided by the identifier mapping table; a positioning request sending module 1230 configured to send the positioning request to the positioned terminal corresponding to the identifier of the positioned terminal; a position information sending module 1240 configured to receive the current position information of the positioned terminal returned by the positioned terminal, and send the current position information to the positioning terminal corresponding to the identifier of the positioning terminal; a positioning closing instruction module 1250 configured to send a position sending success instruction to the positioned terminal after the sending of the current position information is completed, wherein the position sending success instruction is configured to instruct the positioned terminal to turn off the positioning module.

When the positioning module calculates the current position information, a lot of electric energy needs to be consumed. Therefore, after the positioning server sends the current position information to the positioning terminal, the positioning module is not required to continue to calculate the current position information. After the current position information is sent, a position sending success instruction is sent to the positioned terminal to instruct it to turn off the positioning module, so that the positioning module stops calculating the current position information. The save of the electric quantity of the positioning terminal leads to the improvement of the endurance time of the positioned terminal.

The embodiment of the present disclosure also provides a computer storage medium. The computer storage medium stores a plurality of instructions, which are suitable for being loaded by the processor and executing the method steps of any one of the above embodiments.

Figure 13:
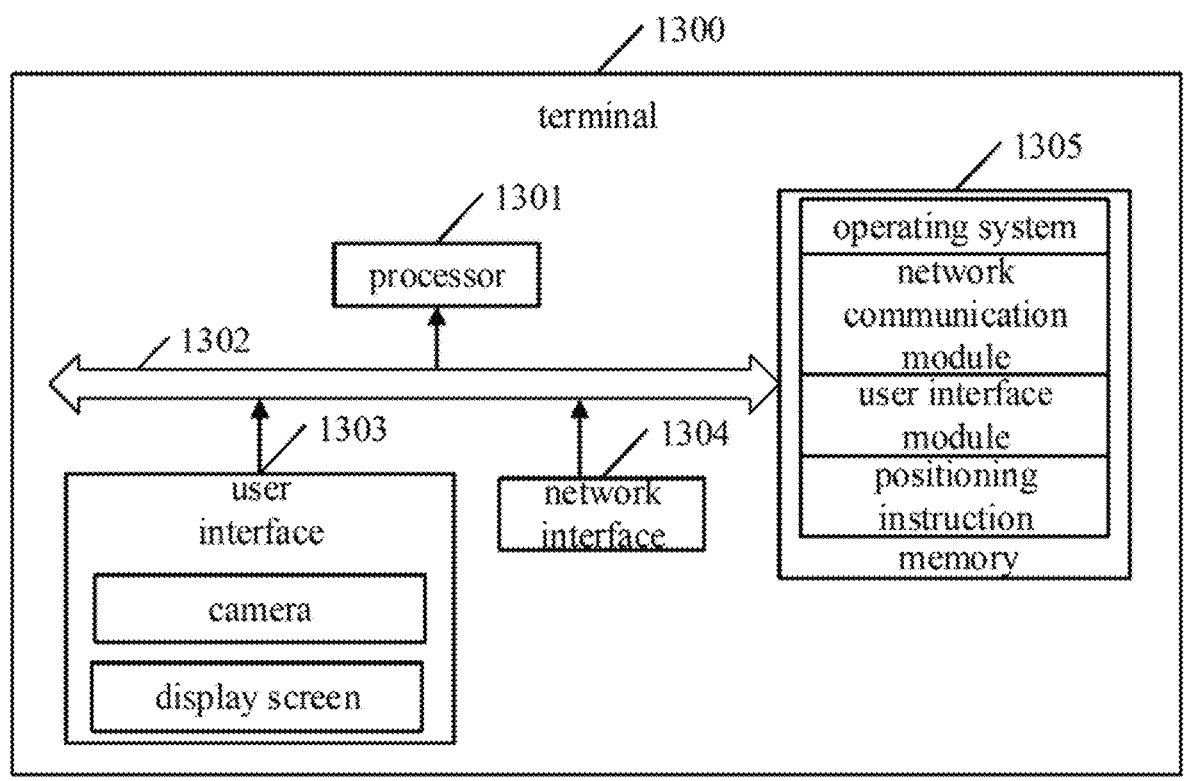
FIG. 13 is a structure diagram of a terminal according to an embodiment of the present disclosure.

Please refer to FIG. 13, which is a structure diagram of a terminal provided by an embodiment of the present disclosure. As shown in FIG. 13, the terminal 1300 may include at least one processor 1301, at least one network interface 1304, the user interface 1303, the memory 1305, and at least one communication bus 1302.

The communication bus 1302 is used for realizing connection communication among these components.

The user interface 1303 may comprise a Display screen, a Camera, and the user interface 1303 may optionally further comprise a standard wired interface and a wireless interface.

The network interface 1304 may optionally comprise a standard wired interface, a wireless interface (such as a Wi-Fi interface).

The processor 1301 may comprise one or more processing cores. The processor 1301 is connected to various parts in the whole terminal 1300 by using various interfaces and lines, and executes various functions of the terminal 1300 and processes data by running or executing instructions, programs, code sets or instruction sets stored in the memory 1305, and invoking data stored in the memory 1305. Optionally, the processor 1301 may be implemented in at least one hardware form of a Digital Signal Processing (DSP), a Field Programmable gate Array (FPGA), and a Programmable Logic Array (PLA). The processor 1301 may be a combination of one or more of a Central Processing Unit (CPU), an image processor (GPU), and a modem and the like.

Wherein the CPU mainly processes the operating system, the user interface, and the application program and the like. The GPU is used for rendering and drawing the content to be displayed on the display screen. The modem is used for processing wireless communication. It can be understood that the modem may not be integrated into the processor 1301, and be implemented by means of a separate chip.

The memory 1305 may comprise a random access memory (RAM), or may comprise a Read-only memory (ROM). Optionally, the memory 1305 includes a non-transitory computer-readable storage medium. The memory 1305 may be configured to store instructions, programs, code, code sets, or instruction sets. The memory 1305 may include a storage program area and a storage data area, wherein the storage program area may store instructions for implementing the operating system, instructions for at least one function (such as a touch function, a sound playing function, and an image playing function, etc.), instructions for implementing the above method embodiments, etc. The storage data area may store data involving the above method embodiments. The memory 1305 may alternatively be at least one storage device located remotely from the processor 1301. As shown in FIG. 13, the memory 1305, as a computer storage medium, may include an operating system, a network communication module, a user interface module, and a positioning instruction.

In the terminal 1300 shown in FIG. 13, the user interface 1303 is mainly configured to provide an input interface for users and acquire data input by the user; while the processor 1301 may be configured to invoke the positioning instruction stored in the memory 1305, and specifically perform the following operations: receiving the positioning request sent by the positioning server, wherein the positioning request carries an identifier of the positioning terminal, and the positioning request is used for requesting the position information of the positioned terminal; triggering to open the positioning module based on the positioning request, and acquiring current position information through the positioning module; sending the current position information to the positioning terminal; turning off the positioning module after the current position information is sent.

In the several embodiments provided in the present disclosure, it should be understood that the disclosed device and methods may be implemented in other manners. For example, the embodiments of the device described above are merely schematic. For example, the division of modules is merely a logical function division, there may be another division manners in actual implementation, for example, multiple modules or components may be combined or integrated into another system, or some features may be ignored or not performed. In addition, the displayed or discussed mutual coupling or direct coupling, or communication connection can be indirect coupling or communication connection through some interfaces, devices or modules, and it can be in electrical, mechanical or other forms.

The modules described as separate parts may or may not be physically separate, and the parts displayed as modules may or may not be physical modules, that is, the parts may be located in one place, or may be distributed on a plurality of network modules. Some or all of the modules can be selected according to actual requirements to achieve the purpose of the technical solutions of the embodiments of the present disclosure.

In addition, functional modules in the embodiments of the present disclosure may be integrated into one processing module, or each of the modules may exist alone physically, or two or more modules may be integrated into one module.

The integrated module mentioned above can be realized in the form of hardware, or be realized in the form of a software functional module.

It should be noted that, for the foregoing methods and embodiments, for simplicity of description, all of them are expressed as a series of action combinations. But those skilled in the art should appreciate that the present disclosure is not limited by the orders of the actions described, because certain steps may be performed in other orders or simultaneously according to the present disclosure. Secondly, people skilled in the art should also know that the actions and modules involved in the description are not all necessary in the embodiments of the present disclosure.

In the above embodiments, the descriptions of various embodiments have different emphasis. The parts that are not described in detail in some embodiments may be referred to in relevant descriptions of other embodiments.

The above is the description of a positioning method, a device, a server, a storage medium, and a terminal provided in the embodiments of the present disclosure. For people skilled in the art, according to the idea of the embodiments of the present disclosure, there may be changes in specific embodiments and application ranges. In summary, the contents of the present description are not to be construed as the limitation of the embodiments of the present disclosure.

The invention claimed is:

1. A positioning method, comprising:
   receiving, by a positioned terminal, a positioning request sent by a positioning server, wherein the positioning request carries an identifier of a positioning terminal and the positioning request is used for requesting position information of the positioned terminal;
   triggering the positioned terminal based on the positioning request, to turn on a positioning module and to obtain current position information through the positioning module;
   sending, by the positioned terminal, the current position information to the positioning terminal; and
   turning off the positioning module, by the positioned terminal, after the sending of the current position information is completed;
   wherein before the positioned terminal receives the positioning request sent by the positioning server the method comprises:
   receiving, by the positioned terminal, a configuration request sent by the positioning server, wherein the configuration request is used for requesting the positioned terminal to manage parameters through NIDC mode;
   determining, by the positioned terminal, whether or not the positioned terminal supports the configuration request based on a device information of the positioned terminal;
   wherein if the positioned terminal supports the configuration request, a built-in OMA client is called to open the NIDC mode, and the parameter configuration of the positioned terminal is set, wherein the parameter configuration comprises one or more of a transmission code rate configuration, a baud rate configuration, a data bit configuration, a parity check bit configuration, and a stop bit configuration; and
   sending, by the positioned terminal, a session establishment request to the positioning server based on the OMA client, and receiving a session management command returned by the positioning server and establishes a session with the positioning server.

2. The method of claim 1 wherein the step of the positioned terminal receiving the positioning request sent by the positioning server, comprising:
   receiving, by the positioned terminal, the positioning request sent by the positioning server based on the OMA client, wherein the positioning request is obtained by the positioning server according to the position acquiring request sent by the positioning terminal that carries the identifier of the positioning terminal.

3. The method of claim 1, wherein the step of positioned terminal being triggered by the positioning request to turn on the positioning module and obtain the current position information through the positioning module, comprises:
   acquiring, by the positioned terminal, a corresponding instruction set of the positioned terminal, wherein the instruction set is generated by one or more of a chip type, a chip model, a chip platform, and an operating system of the positioned terminal;
   acquiring, by the positioned terminal, positioning characters in the positioning request, and searches the instruction set for a position calculating instruction matching the positioning characters;
   sending, by the positioned terminal, the position calculating instruction to a modem based on the OMA client, wherein the position calculating instruction is used to trigger the modem to open the positioning module and control the positioning module to calculate and derive the current position information; and
   obtaining, by the positioned terminal, the current position information based on the modem.

4. The method of claim 3, wherein the step of positioned terminal sending the current position information to the positioning terminal comprises:
   the positioned terminal sends the current position information to the positioning terminal corresponding to the identifier of the positioning terminal in a form of a short message based on the modem, and/or
   the positioned terminal sends the current position information to the positioning server based on the modem and sends the current position information to the positioning terminal corresponding to the identifier of the positioning terminal through the positioning server.

5. A positioning device, comprising a non-transitory memory, a processor, and a computer program stored on the non-transitory memory and capable of running on the processor, wherein the processor implements the steps of the method of claim 1 while executing the computer program.

6. A positioning method, comprising:
   receiving, by a positioning server, a position acquiring request sent by a positioning terminal, wherein the position acquiring request carries an identifier of the positioning terminal;
   converting, by the positioning server, the position acquiring request into a positioning request that can be recognized by a positioned terminal and includes positioning characters, and obtaining the identifier of the positioned terminal matching the identifier of the positioning terminal provided by an identifier mapping table;
   sending, by the positioning server, the positioning request to the positioned terminal corresponding to the identifier of the positioned terminal;
   receiving, by the positioning server, current position information of the positioned terminal returned by the positioned terminal, and sending the current position information to the positioning terminal corresponding to the identifier of the positioning terminal; and after the sending of the current position information is completed, sending, by the positioning server, a position sending success instruction to the positioned terminal, wherein the position sending success instruction is used to instruct the positioned terminal to turn off a positioning module;

wherein before the positioning server sends the positioning request to the positioned terminal corresponding to the identifier of the positioned terminal, the method comprises:

sending, by the positioning server, a configuration request received by the positioned terminal, wherein the configuration request is used for requesting the positioned terminal to manage parameters through NIDC mode; wherein the positioned terminal determines whether or not the positioned terminal supports the configuration request based on a device information of the positioned terminal: wherein if the positioned terminal supports the configuration request, a built-in OMA client is called to open the NIDC mode, and the parameter configuration of the positioned terminal is set wherein the parameter configuration comprises one or more of a transmission code rate configuration, a band rate configuration, a data bit configuration, a parity check bit configuration, and a stop bit configuration; and the positioned terminal sends a session establishment request to the positioning server based on the OMA client, and receives a session management command returned by the positioning server and establishes a session with the positioning server.

7. A positioning server, comprising a non-transitory memory, a processor, and a computer program stored on the non-transitory memory and capable of running on the processor, wherein the processor implements the steps of the method of claim 6 while executing the computer program.

* * * * *